United States Patent
McElheney

(10) Patent No.: US 6,755,491 B2
(45) Date of Patent: Jun. 29, 2004

(54) OPERATOR INTERFACE TERMINAL FOR USE IN A HARSH ENVIRONMENT

(76) Inventor: Billy W. McElheney, 312 E. Avenue E, Midlothian, TX (US) 76065

(*) Notice: Subject to any disclaimer, the term of this patent is extended or adjusted under 35 U.S.C. 154(b) by 0 days.

(21) Appl. No.: 09/891,933

(22) Filed: Jun. 26, 2001

(65) Prior Publication Data

US 2002/0195912 A1 Dec. 26, 2002

(51) Int. Cl.[7] .............................................. A47B 81/00
(52) U.S. Cl. ..................................... 312/242; 312/223.3
(58) Field of Search .................... 108/50.02; 312/223.3, 312/242, 245, 7.2, 223.2, 313; 52/36.2

(56) References Cited

U.S. PATENT DOCUMENTS

| | | | |
|---|---|---|---|
| 4,718,740 A | | 1/1988 | Cox |
| 4,825,457 A | * | 4/1989 | Lebowitz ...................... 348/143 |
| 4,827,439 A | | 5/1989 | Licht |
| 4,902,881 A | * | 2/1990 | Janku .......................... 235/375 |
| 4,941,656 A | * | 7/1990 | Davies et al. ................ 271/278 |
| 5,082,336 A | * | 1/1992 | Munch et al. ............... 312/292 |
| 5,281,018 A | | 1/1994 | Cullinan |
| 5,594,471 A | | 1/1997 | Deeran et al. |
| 5,638,646 A | * | 6/1997 | Shane ....................... 235/382.5 |
| 5,758,935 A | | 6/1998 | Coonan |
| 5,913,582 A | | 6/1999 | Coonan |
| 5,954,408 A | * | 9/1999 | Bogucki ...................... 248/371 |
| 5,961,192 A | * | 10/1999 | Bernart et al. ................ 108/60 |
| 6,046,761 A | * | 4/2000 | Echerer .................... 348/14.01 |
| 6,205,716 B1 | * | 3/2001 | Peltz .......................... 345/753 |
| 6,292,211 B1 | * | 9/2001 | Pena ........................ 348/14.08 |
| 2002/0011032 A1 | * | 1/2002 | Choi .............................. 52/27 |

FOREIGN PATENT DOCUMENTS

| | | | |
|---|---|---|---|
| DE | 20016796 | * | 12/2000 |
| JP | 10326122 | * | 12/1998 |

* cited by examiner

*Primary Examiner*—Janet M. Wilkens
(74) *Attorney, Agent, or Firm*—Michael L. Diaz

(57) ABSTRACT

A hardened Operator Interface Terminal (OIT) in an environmentally harsh area interfaces with computer components such as a control computer and a computer monitor in a controlled environment that is separated from the harsh environment by a wall or door. A sealed front panel mounts on the front side of the wall or door, and is exposed to the harsh environment while the computer components mount on shelves that are located on the back side of the wall or door. One of the shelves holds the monitor and is adjustable to align the monitor with a touch screen panel that is sealed in a window in the front panel. The shelves provide easy access to the computer components for service. A pivoting keyboard tray on the front panel holds a keyboard and mouse, and is fully sealed. The OIT is easily disassembled and packaged into a compact size for shipping.

14 Claims, 6 Drawing Sheets

OPERATOR INTERFACE TERMINAL FOR USE IN A HARSH ENVIRONMENT

BACKGROUND OF THE INVENTION

1. Technical Field of the Invention

This invention relates to computer interface equipment and, more particularly, to an Operator Interface Terminal (OIT) for use in a harsh industrial environment.

2. Description of Related Art

The prior art includes numerous references describing stand-alone consoles suitable for use in harsh factory environments. Examples of these references include U.S. Pat. No. 4,827,439 to Licht, U.S. Pat. No. 5,281,018 to Cullinan, and U.S. Pat. No. 5,913,582 to Coonan. Each of these references describes a sealed console that houses computer components and protects the computer components from a harsh external environment such as a process factory floor.

However, each of the prior art consoles, suffers from several disadvantages. For example, each of the consoles occupies valuable space on the factory floor. On some crowded factory floors, this is a severe disadvantage. In addition, if the factory environment is one of high temperature or other conditions that are hazardous to computer equipment, the interior of the stand-alone consoles must be conditioned to protect the computer components. Finally, the consoles require that there be adequate space surrounding the consoles for an access door on the consoles to be opened in order to remove or service the computer components housed within the consoles. Once again, this can be a severe disadvantage on crowded factory floors.

In order to overcome the disadvantage of existing solutions, it would be advantageous to have an Operator Interface Terminal (OIT) that overcomes the disadvantages of the prior art. The present invention provides such an OIT.

SUMMARY OF THE INVENTION

The invention is a hardened Operator Interface Terminal (OIT) providing a Man-Machine Interface (MMI) for computer components such as a control computer. The OIT may be used on a process factory floor or other environmentally harsh area that would be hazardous to computer equipment, monitors, and input equipment such as a keyboard or mouse. The OIT mounts on the front side of a vertical room-partition such as a wall or door in such a way that a sealed front panel is exposed to the harsh factory environment while the computer components mount on shelves that are located on the back side of the wall or door. Thus, the OIT does not require any square footage on the crowded and valuable factory floor. Additionally, the computer components, which may be any off-the-shelf components, may be located, for example, in an air-conditioned office or storeroom that is separated from the factory floor by the door or wall. The shelves provide easy access to the computer components for service or replacement. Finally, the entire OIT is easily disassembled and packaged into a compact size for shipping.

Thus, in one aspect, the present invention is a space-saving OIT for providing a man-machine interface between an operator working in a harsh environment and a control computer in a conditioned environment without utilizing floor space for the OIT in the harsh environment. The OIT includes a front panel having a perimeter edge, and means for mounting the front panel on a front side of a vertical room-partition and sealing the front panel around the perimeter edge. The vertical room-partition has a front side in the harsh environment, a back side in the controlled environment, and an aperture therein that is covered by the front panel. At least one interface device is attached to the front panel, and is accessible by the operator for providing inputs to the control computer. The OIT also includes means for connecting the interface device to the control computer through the aperture in the vertical room-partition. The front panel may have a sealed window, and the OIT may further include an adjustable shelf mounted on a back side of the vertical room-partition in the controlled environment for mounting a computer monitor in a position where the monitor is visible to the operator through the window. The monitor may be used in conjunction with a touch screen panel that is mounted in the sealed window. The OIT may also include a keyboard support and storage tray pivotally mounted to the front panel for holding a keyboard. The tray may be pivoted downward to an approximately horizontal position when the keyboard is in use by the operator, and pivoted upward to an approximately vertical position when the keyboard is not in use. The tray is sealed in both positions to prevent elements from the harsh environment from entering the controlled environment behind the OIT.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
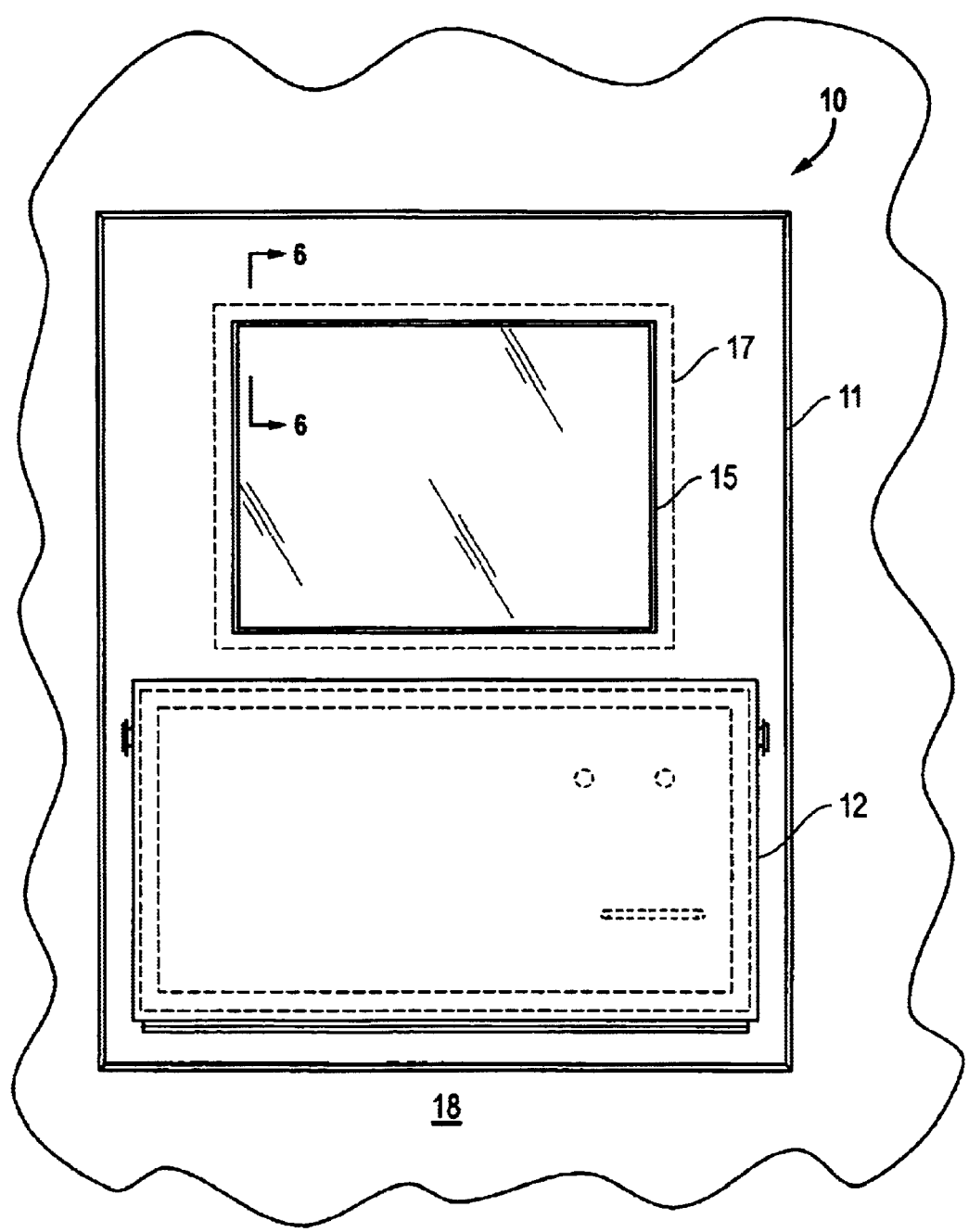
FIG. 1 is a front elevational view of the preferred embodiment of the Operator Interface Terminal (OIT) of the present invention.

FIG. 1 is a front elevational view of the preferred embodiment of the OIT 10 of the present invention. A front panel 11 includes a fold-down tray 12 that holds a keyboard 13 and a mouse 14 (see FIG. 5). A window 15 above the tray is for viewing a monitor 16 (see FIG. 2). The bottom edge of the window may be cut sloping slightly downward and forward (for example, a 10-degree slope) so that any water that gets on the edge will run off. A raised ridge 17 surrounds the window on the back side of the front panel. The front panel is shown mounted on a section of a wall or door 18. The front panel may be constructed of a suitable hard material that is resistant to the harsh environment where the OIT is installed. For example, the preferred embodiment is constructed of stainless steel which is preferred for a process factory floor due to its corrosion resistance properties.

Figure 2:
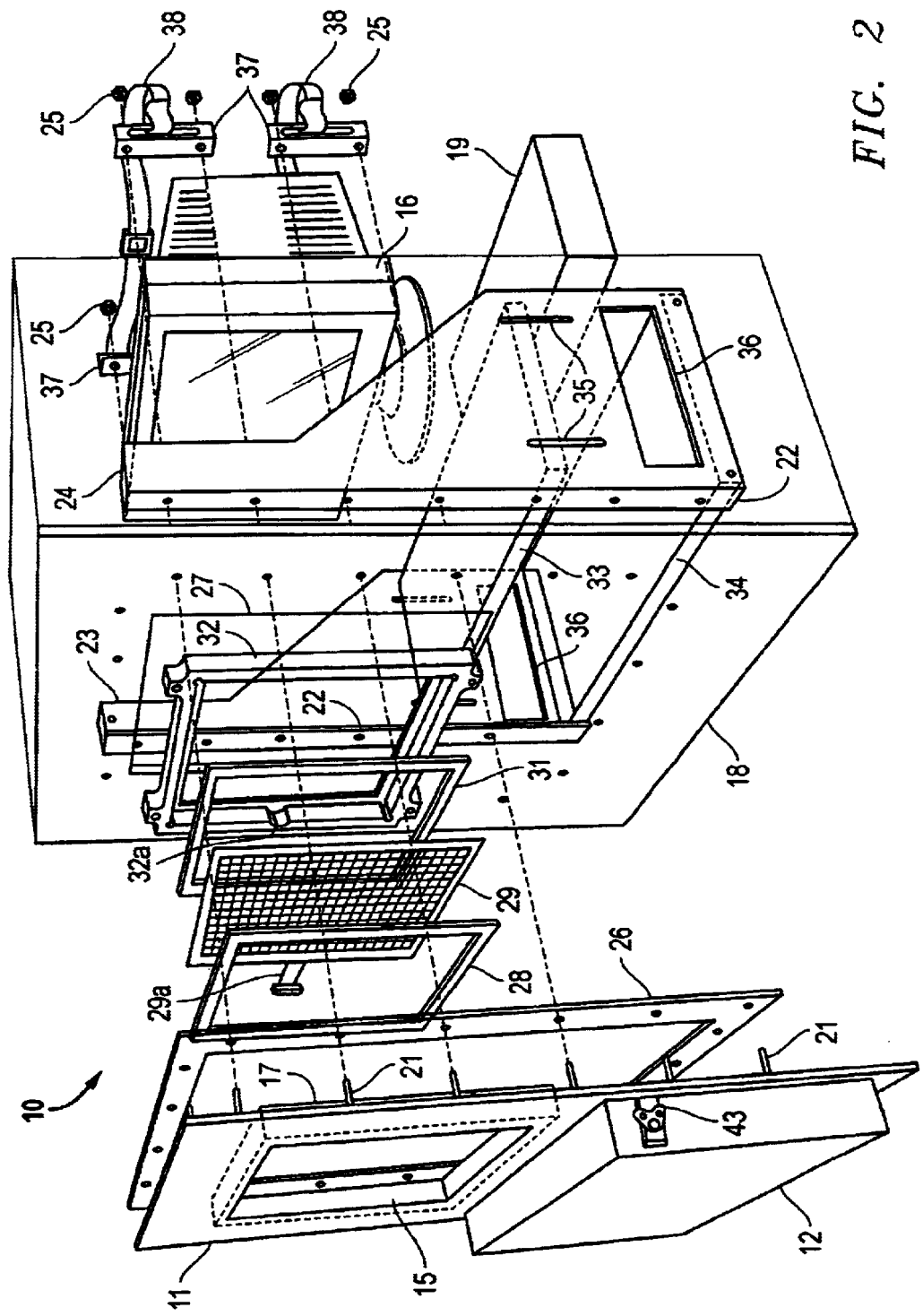
FIG. 2 is an exploded perspective view of the OIT of the present invention when mounted on an exemplary wall segment, and with a computer and monitor installed.

FIG. 2 is an exploded perspective view of the OIT 10 of the present invention when mounted on the exemplary wall segment 18, and with a computer 19 and monitor 16 installed. The front panel 11 includes a plurality of bolts 21 around its perimeter. The bolts extend through a gasket 26, the wall 18, and through a flange 22 of two flanged side panels 23 and 24. The bolts are secured with nuts 25 to hold the OIT securely on the wall. Thus, the door or wall is sandwiched between the side flanges and the front panel. The bolts can be of varying lengths, depending on the thickness of the door or wall. The gasket 26 covers the perimeter of the back side of the front panel, and creates a seal between the front panel and the wall.

An aperture 27 is cut in the wall 18 behind the window 15 in the front panel. The raised ridge 17 surrounding the window on the back side of the front panel fits into the aperture 27. Surrounding the raised ridge is a second gasket 28 which is used to provide a seal on the front side of a flat panel touch screen 29 which is mounted in the window. The touch screen may be a resistive touch screen which is covered on the front side by a plastic resistive X–Y coordinate layer. The resistive screen is preferred because the protective plastic layer prevents the glass from being directly exposed to the factory environment. If the touch screen is impacted hard enough to break the glass, the outer resistive layer prevents glass fragments from contaminating the factory. This is important in industries such as the food industry. A third gasket 31 is mounted on the back side of the touch screen. The gaskets are preferably constructed of ⅛-inch gasket material since it is desirable to minimize the distance from the touch screen 29 to the monitor 16 in order to reduce parallax error when viewing the monitor from an angle.

A protective frame 32 fits over the touch screen and gaskets, and over the raised edge 17. The frame may preferably be constructed from aluminum because of its light weight and durability. The frame is secured with four bolts that extend from the back of the front panel 11 at the corners of the window 15. The frame is sized with very close tolerances to exactly fit over the raised ridge. This makes the touch screen self-centering in the window. The frame includes a notch 32a in one side to allow for passage of a ribbon cable 29a that extends from the touch screen and connects to an interface device (not shown) that is mounted under the window 15. The touch screen may be connected to the control computer, for example, by a MICROTOUCH controller. The MICROTOUCH controller is preferred because it utilizes a 5-point calibration scheme for greater accuracy in aligning the X and Y axes of the screen.

The two flanged side panels 23 and 24 support a top shelf 33 and a bottom shelf 34. The top shelf 33 supports the monitor 16, and the bottom shelf holds the computer 19. The top shelf may be vertically adjusted using adjustment slots 35 to position monitors of different sizes directly behind the aperture 27 in the wall which is aligned with the window 15 in the front panel 11 of the OIT. The adjustability of the monitor shelf enables the use of any off-the-shelf monitor. It is preferable to use an LCD monitor, or a CRT monitor with a flat screen and a flat bezel such as those available from ViewSonic, in combination with the touch screen 29. The preferred embodiment may use either a 15-inch LCD or a 17-inch CRT monitor.

The bottom shelf 34 holds the computer 19. In the preferred embodiment, a computer with a miniature casing approximately 3 inches×10 inches×11 inches is utilized. If the computer is mounted sideways, access to the front and back of the computer is provided through openings 36 in the side panels. In an alternative embodiment, the control computer is remotely located from the OIT, and the OIT includes a wireless RF transmitter or other transmission device to carry signals from the OIT to the remotely located computer.

Optionally, the OIT may include monitor retaining brackets 37 that mount on the bolts 21 behind the flanged side panels 23 and 24. Retaining straps 38 such as nylon straps pass through the retaining brackets and pass around the back side of the monitor 16. The straps can be tightened to hold the monitor securely against the back side of the protective frame 32. An optional padding (not shown) may be mounted on the front bezel of the monitor to cushion the monitor. The padding should be as thin as possible to minimize the distance between the monitor and the touch screen 29, thereby minimizing parallax error when the monitor is viewed at an angle. By strapping the monitor tightly against the padding, the distance between the touch screen and the monitor is reduced to ¼ to ⅜ inch, thus reducing the parallax effects. This also prevents dust from getting on the monitor screen and on the back of the touch screen. In addition, since the monitor and other computer components may be in a lighted room, pressing the bezel of the monitor against the padding shields the monitor screen from light that might otherwise get in around the bezel and decrease the quality of the displayed image.

Figure 3:
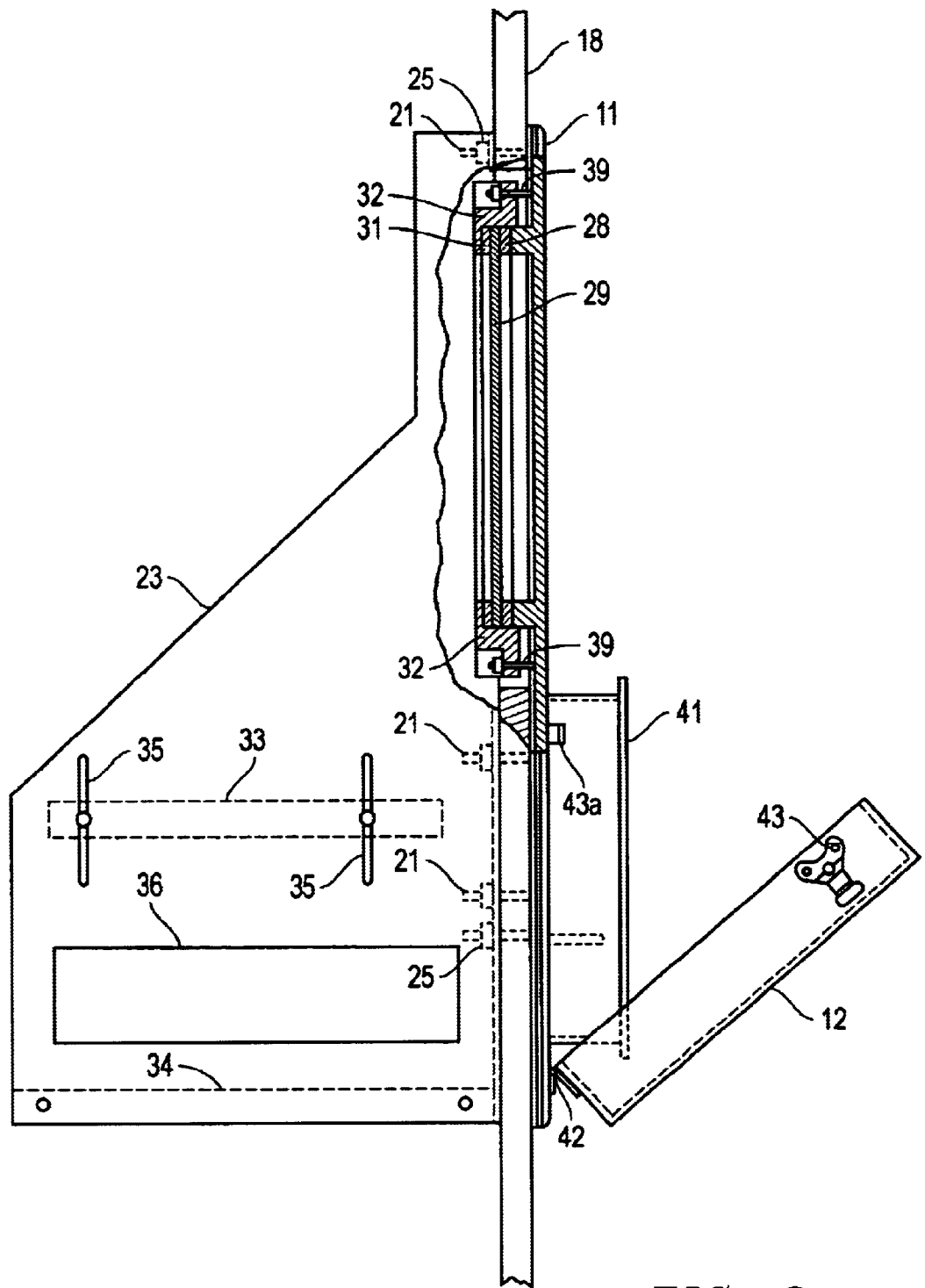
FIG. 3 is a left side elevational view showing a partial cross-section of the OIT of FIG. 1 mounted on an exemplary wall segment.

FIG. 3 is a left side elevational view showing a partial cross-section of the OIT 10 mounted on the exemplary wall segment 18. In this view, two of the four mounting bolts 39 can be seen that are used to mount the protective frame 32 over the back of the touch screen 29 and gaskets 28 and 31. Additionally, the keyboard tray 12 is shown pivoted to a partially open position, exposing a protective channeling structure 41 that functions to channel away any water or other liquid that may be sprayed against the front panel 11. A hinge 42 such as a piano hinge is utilized for pivoting the tray between the up and down position. A locking mechanism 43 is utilized with a locking tab 43a to lock the tray in the up position.

Figure 4:
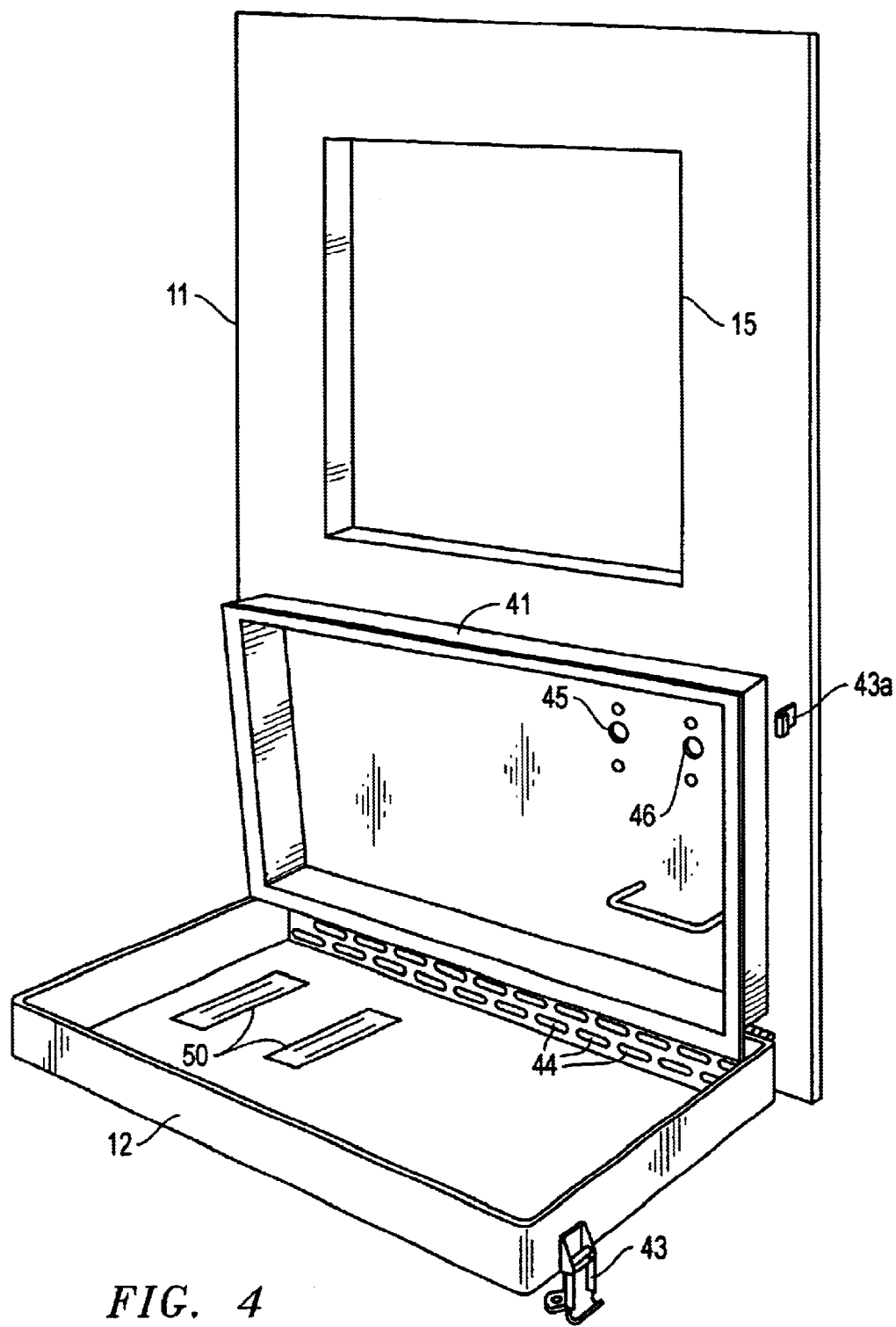
FIG. 4 is a perspective view of the OIT of FIG. 1 with the keyboard tray pivoted to the down position.

FIG. 4 is a perspective view of the OIT of FIG. 1 with the keyboard tray 12 pivoted to the down (open) position. In this view, weep holes 44 are visible in the back wall of the tray. When the tray is in the up position, the back wall is the bottom wall, and the weep holes allow liquid to pass through the holes if any liquid is channeled down the sides of the channeling structure 41. The weep holes may be configured as overlapping slits to prevent any runoff into the tray when the tray is lowered. Two other apertures 45 and 46 are shown in the front panel 11 within the area covered by the keyboard tray. As discussed below in connection with FIG. 5, these apertures allow for control cables to pass through the front panel to the computer 19. Four small screw holes are also shown around the apertures 45 and 46, and are used to mount watertight connectors 48 and 49 (FIG. 5) on the back side of the front panel. Two attachment strips 50 are utilized to attach the keyboard 13 to the base of the keyboard tray. The strips may be adhesive strips or a hook-and-pile material such as Velcro.

Figure 5:
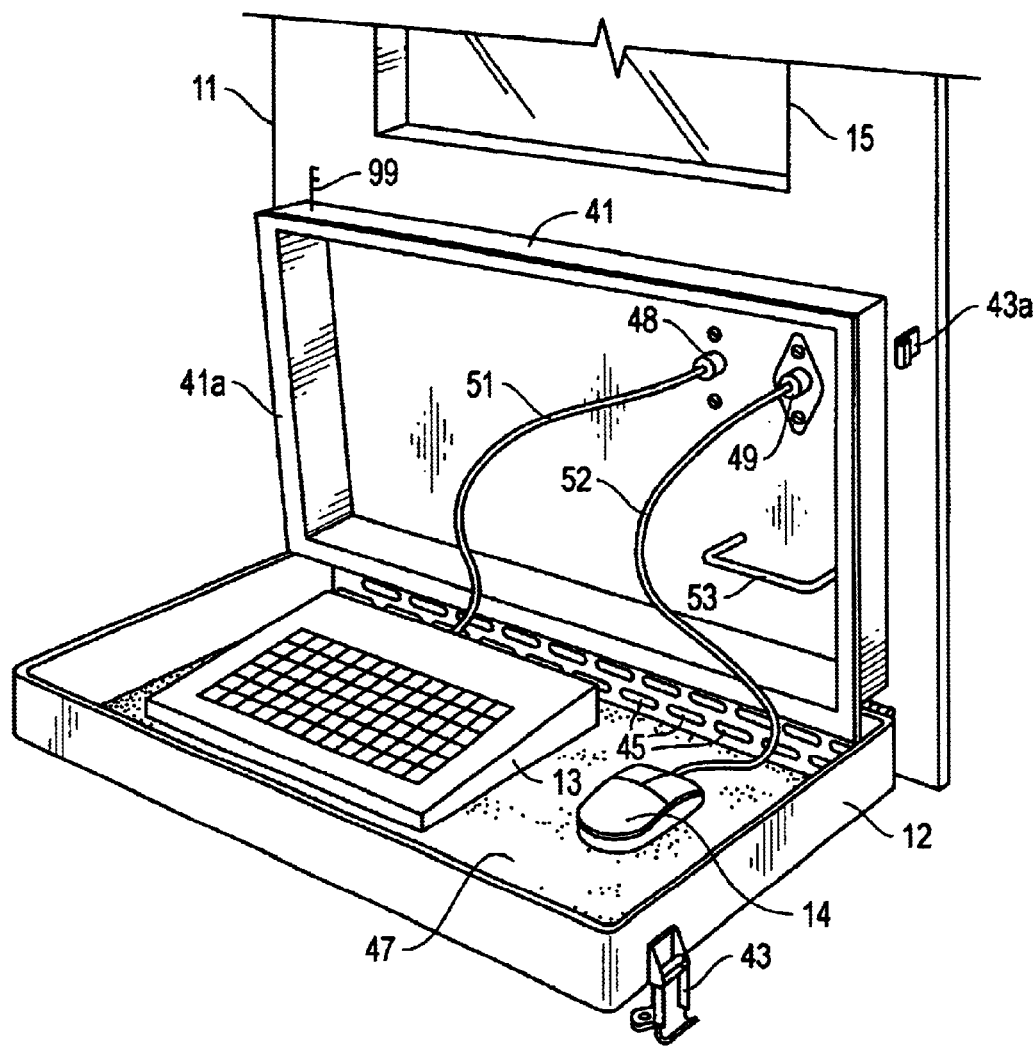
FIG. 5 is a perspective view of the OIT of FIG. 4 with a keyboard, mouse, and gasket installed in the keyboard tray.

FIG. 5 is a perspective view of the OIT of FIG. 4 with the keyboard 13, mouse 14, and a gasket 47 installed in the keyboard tray 12. An aerated rubber gasket 47 covers the base of the tray and seals the tray by contacting a raised ridge 41a on the front of channeling structure 41 when the tray is in the up position. The gasket doubles as a mouse pad in the down position. The gasket may be cut away under the keyboard so that the keyboard can be mounted to the base of the tray using the attachment strips 50 which may be adhesive strips or a hook-and-pile material such as VEL-CRO. Two watertight connectors 48 and 49 are placed in the apertures 45 and 46, and are utilized to connect the keyboard and mouse control cables 51 and 52, respectively, to the computer 19. In this way, the interior of the OIT remains sealed, and internal electronics of the OIT are not exposed to the elements when the fold-down tray is in the down position. The mouse 14 may be stored in a mounting bracket 53 when the keyboard tray is pivoted to the up position. Inputs may be made to the computer simultaneously with the touch screen 29, the keyboard 13, and the mouse 14. Each input device also provides redundancy if one of the other input devices should fail. Alternatively, the computer may be remotely located from the OIT and the OIT may include a wireless RF transmitter 99 or other transmission device to carry signals form the OIT to the remotely located computer.

Figure 6:
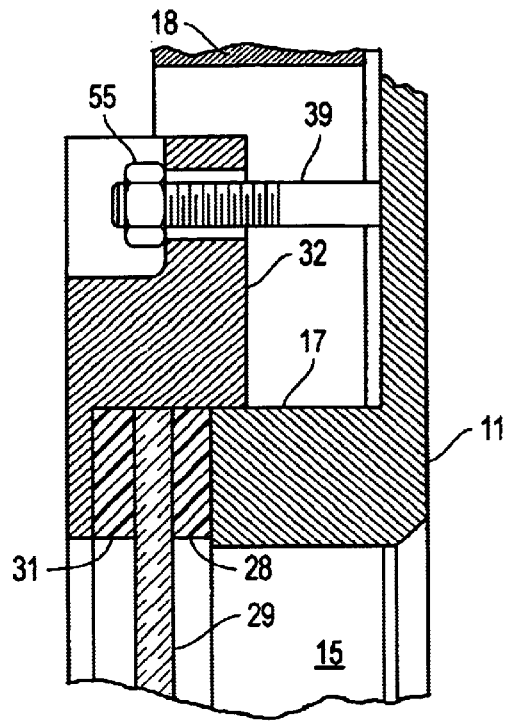
FIG. 6 is a cross-sectional view of a portion of the OIT taken along line 6—6 of FIG. 1 illustrating the structure for mounting the protective frame over the touch screen in the preferred embodiment of the present invention.

FIG. 6 is a left side, partial cross-sectional view of a portion of the OIT taken along line 6—6 of FIG. 1 illustrating the structure for mounting the protective frame 32 over the touch screen 29 in the preferred embodiment of the present invention. The frame 32 fits snugly over the raised ridge 17, thereby causing the touch screen 29 to self-center within the window 15. As the nut 55 is tightened on the bolt 39, the gaskets 28 and 31 are compressed, creating a tight seal on each side of the touch screen. This also minimizes the distance between the touch screen and the monitor 16 which is mounted adjacent to the back side of the frame. As noted above, this helps to minimize parallax error when viewing the monitor from an angle.

Figure 7:
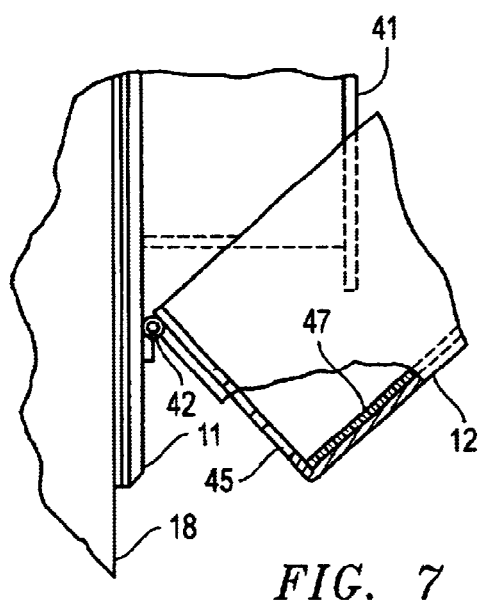
FIG. 7 is a left side, partial cross-sectional view of the bottom portion of the keyboard tray illustrating the tray partially pivoted to the down position.

FIG. 7 is a left side, partial cross-sectional view of the bottom portion of the keyboard tray 12 illustrating the tray partially pivoted to the down position. This view illustrates the positioning of the gasket/mouse pad 47 in the base of the tray.

Figure 8:
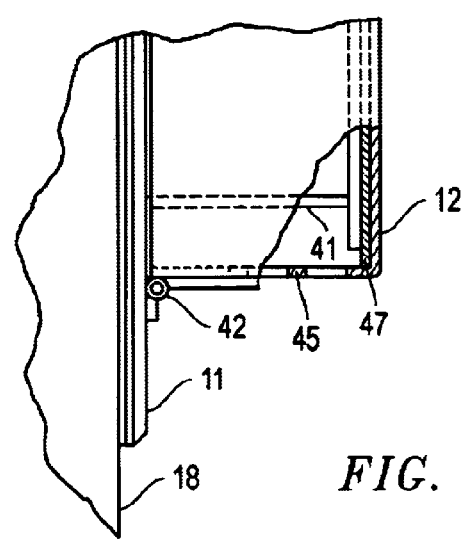
FIG. 8 is a left side, partial cross-sectional view of the bottom portion of the keyboard tray illustrating the tray pivoted to the up position.

FIG. 8 is a left side, partial cross-sectional view of the bottom portion of the keyboard tray 12 illustrating the tray pivoted to the up position. This view illustrates how the gasket/mouse pad 47 in the base of the tray contacts the front surface of the channeling structure 41 when the keyboard tray is closed.

It is thus believed that the operation and construction of the present invention will be apparent from the foregoing description. While the apparatus shown and described has been characterized as being preferred, it will be readily apparent that various changes and modifications could be made therein without departing from the scope of the invention as defined in the following claims.

What is claimed is:

1. A space-saving Operator Interface Terminal (OIT) for providing a man-machine interface between an operator working in a harsh environment and a control computer in a conditioned environment without utilizing floor space for the OIT in the harsh environment, said OIT comprising:

a front panel having a perimeter edge;

means for mounting the front panel on a front side of a vertical room-partition and sealing the front panel around the perimeter edge, said vertical room-partition having a front side in the harsh environment, a back side in the controlled environment, and an aperture therein that is covered by the front panel;

the front panel having a sealed window, and the OIT further comprising a first shelf mounted on a back side of the vertical room-partition in the controlled environment, said first shelf being adjustable in height for mounting a computer monitor in a position where the monitor is visible to the operator through the window;

at least one interface device attached to the front panel that is accessible by the operator for providing inputs to the control computer;

a seal associated with the interface device that prevents leakage from the harsh environment around the interface device; and means for connecting the interface device to the control computer through the aperture in the vertical room-partition.

2. The OIT of claim 1 wherein a touch screen panel is mounted in the sealed window, said touch screen panel being operable in conjunction with the computer monitor.

3. The OIT of claim 1 further comprising a second shelf mounted on the back side of the vertical room-partition for holding the control computer in the controlled environment.

4. A space-saving Operator Interface Terminal (OIT) for providing a man-machine interface between an operator working in a harsh environment and a control computer in a conditioned environment without utilizing floor space for the OIT in the harsh environment, said OIT comprising:

a front panel having a perimeter edge;

means for mounting the front panel on a front side of a vertical room-partition and sealing the front panel around the perimeter edge, said vertical room-partition having a front side in the harsh environment, a back side in the controlled environment, and an aperture therein that is covered by the front panel;

the front panel having a keyboard support and storage tray pivotally mounted to the front panel for holding a keyboard, said tray pivoting downward to an approximately horizontal position when the keyboard is in use by the operator, and pivoting upward to an approximately vertical position when the keyboard is not in use; and means for sealing the keyboard support and storage tray from the harsh environment when the tray is pivoted upward to the approximately vertical position;

at least one interface device attached to the front panel that is accessible by the operator for providing inputs to the control computer;

a seal associated with the interface device that prevents leakage from the harsh environment around the interface device; and means for connecting the interface device to the control computer through the aperture in the vertical room-partition.

5. The OIT of claim 4 wherein the keyboard support and storage tray also supports a mouse and mouse pad for providing inputs to the control computer.

6. The OIT of claim 5 wherein the keyboard and mouse each include control cables that pass through two control-cable apertures in an area of the front panel that is covered by the keyboard support and storage tray when the tray is pivoted upward to the approximately vertical position.

7. The OIT of claim 6 wherein the keyboard and mouse control cables include electrical connectors on the ends thereof that connect to control-computer connectors that are mounted in the two apertures in the front panel, and wherein the seal associated with the interface device that prevents leakage from the harsh environment around the interface device includes two watertight plugs that seal the two control-cable apertures around the control-computer connectors.

8. A spacing-saving Operator Interface Terminal (OIT) for providing a man-machine interface between an operator working in a harsh environment and a control computer in a conditioned environment without utilizing floor space for the OIT in the harsh environment, said OIT comprising:
- a front panel having a perimeter edge and a window therein;
- a plurality of bolts around the perimeter edge of the front panel for mounting the front panel on a front side of a vertical room-partition by extending the bolts through the partition, said partition having a front side in the harsh environment, a back side in the controlled environment, and an aperture therein that is aligned with the window in the front panel;
- a gasket around the perimeter edge of the front panel mounted between the front panel and the vertical room-partition, said gasket sealing the front panel around the perimeter edge;
- a touch screen panel sealed and mounted in the window for providing operator inputs to the control computer;
- a keyboard support and storage tray for holding a keyboard, said tray being pivotally mounted to the front panel and pivoting downward to an approximately horizontal position when the keyboard is in use by an operator, and pivoting upward to an approximately vertical position when the keyboard is not in use; and
- a gasket and channeling structure for sealing the keyboard support and storage tray from the harsh environment when the tray is pivoted upward to the approximately vertical position.

9. The OIT of claim 8 further comprising two flanged side panels mounted vertically on the back side of the vertical room-partition, each of the side panels being mounted on the bolts on the perimeter of the front panel, said side panels supporting between them a vertically adjustable horizontal shelf for holding a computer monitor and aligning the monitor with the touch screen panel mounted in the window.

10. The OIT of claim 9 further comprising at least one horizontal shelf within the controlled environment for holding the control computer.

11. A space-saving Operator Interface Terminal (OIT) for providing a man-machine interface between an operator working in a harsh environment and a control computer in a conditioned environment without utilizing floor space for the OIT in the harsh environment, said OIT comprising:
- a front panel having a perimeter edge and an aperture therein for a control cable;
- a plurality of bolts around the perimeter edge of the front panel for mounting the front panel on a front side of a vertical room-partition having a front side in the harsh environment, a back side in the controlled environment, and the aperture therein for the control cable;
- a gasket around the perimeter edge of the front panel mounted between the front panel and the vertical room-partition, said gasket sealing the front panel around the perimeter edge;
- a keyboard support and storage tray pivotally mounted to the front panel below a window for holding a keyboard having a control cable, said tray pivoting downward to an approximately horizontal position when the keyboard is in use by an operator, and pivoting upward to an approximately vertical position when the keyboard is not in use;
- means for sealing the aperture in the front panel around the keyboard control cable; and
- means for sealing the keyboard support and storage tray from the harsh environment when the tray is pivoted upward to the approximately vertical position.

12. A space-saving Operator Interface Terminal (OIT) for providing a man-machine interface between an operator working in a harsh environment and a computer in a conditioned environment without utilizing floor space for the OIT in the harsh environment, said OIT comprising:
- a front panel having a perimeter edge;
- means for mounting the front panel on a front side of an enclosure and sealing the front panel around the perimeter edge, said enclosure having a front side in the harsh environment, a back side in the controlled environment, and an aperture therein that is covered by the front panel, said means for mounting the front panel prevents the passage of any liquids from the harsh environment into the controlled environment;
- at least one interface device attached to the front panel that is accessible by the operator for providing inputs to the computer;
- means for connecting the interface device to the computer through the aperture in the enclosure and
- a seal associated with the interface device that prevents leakage from the harsh environment around the interface device, and wherein the front panel includes a sealed window, and the OIT further comprises a first shelf mounted on a back side of the enclosure in the controlled environment, said first shelf being adjustable in height.

13. The OIT of claim 12 wherein the means for connecting the interface device to the computer through the aperture in the enclosure includes at least one control cable that passes through a control-cable aperture in an area of the front panel, the control cable having an electrical connector on the end thereof that connects to a computer connector that is mounted in the aperture in the front panel and wherein a seal associated with the interface device prevents leakage from the harsh environment around the interface device and includes a watertight plug that seals the aperture around the computer connector.

14. The OIT of claim 12 wherein the computer is remotely located from the OIT, and the OIT further comprises means for transmitting the control signals from the OIT to the computer.

* * * * *